Patented Dec. 8, 1936

2,063,623

UNITED STATES PATENT OFFICE 2,063,623

PRODUCTION OF LUBRICATING OIL

Mathias Pier, Heidelberg, and Ernst Donath, Mannheim, Germany, assignors to I. G. Farbenindustrie Aktiengesellschaft, Frankfort-on-the-Main, Germany No Drawing. Application March 23, 1934, Serial No. 717,074. In Germany March 28, 1933

12 Claims. (Cl. 87—9)

The present invention relates to the production of lubricating oils, more particularly by a method involving thermal splitting of the materials to be treated.

We have found that lubricating oils or products similar to lubricating oils can be obtained in a simple and advantageous manner by heating under elevated pressure, preferably above 20 atmospheres, such as 40 atmospheres or more, hard or soft paraffin waxes or aliphatic hydrocarbon derivatives of high molecular weight above 250, preferably above 300 in particular the oxygen containing derivatives, such as carboxylic acids or alcohols, or mixtures containing such substances in the presence of catalysts having a dehydrogenating action and preferably having at the same time a condensing action, the heating being only of such strength and duration, however, that the reaction product contains substantial amounts, preferably about 20 per cent or more of constituents of high boiling point, i. e. boiling above 200° C. in vacuo, the hydrogen content of which is only slightly less, as for example about 10 per cent less, than that of the initial material. By working in this manner, a splitting of the initial material takes place but also at the same time a condensation of part of the cracking products to form lubricating oils or products similar to lubricating oils. In addition to hard or soft paraffin waxes, petrolatum, alcohols, acids or esters of high molecular weight, and waxes, as for example Montan wax, are suitable as initial materials.

The process may be carried out by allowing the initial material to flow through a vessel heated to a suitable temperature which is generally between 200° and 450° C. The catalyst may be rigidly arranged in this vessel or be incorporated with the initial material. As catalysts may be mentioned especially the elements of the 5th to the 8th groups of the periodic system, such as molybdenum, tungsten, chromium, sulphur, vanadium, manganese, nickel, cobalt, iron or mixtures of these or of their compounds, as for example oxides or sulphides. Other elements, as for example copper, silver, zinc, copper-zinc, cadmium, aluminium or boron may also be employed, preferably in admixture with the elements of the 5th to the 8th groups of the periodic system. The catalysts may be arranged on carriers, as for example active carbon, lignite coke, silica or bleaching earths.

The desired reaction is favored by high pressures, as for example 20, 50 or 100 atmospheres or more. The pressure may be produced by the effect of the heat and the initial material alone or in conjunction with the aid of gases, such as nitrogen, methane, hydrogen or other inert gases, as for example cracking gases.

In many cases it is advantageous to add to the said catalysts substances having a strong condensing action, such as catalysts of the Friedel-Crafts type, as for example aluminium chloride, zinc chloride, iron chloride, boron fluoride or phosphorus oxychloride, or also sulphur or sulphur compounds which latter besides their catalytic action also have a condensing action and therefore are employed with advantage together with another catalytically active substance. In this case it is not necessary to employ very high pressures; pressures of from about 10 to 50 atmospheres are sufficient though also higher pressures may be employed.

The period during which the products remain in the reaction chamber depends on the reaction temperature and pressure; it may be less the higher the temperature and the pressure; generally speaking it amounts to from ½ to 6 hours. When carrying out the reaction under a pressure of 100 atmospheres or more, a duration of about 2 hours and a temperature of from 410° to 450° C. may be employed. In the case of pressures of less than 100 atmospheres, the duration is preferably from 4 to 6 hours and the temperature less than 430° C., as for example from 400° to 410° C. The catalysts are added in amounts of at least 0.5 per cent, preferably more than 1 per cent with reference to the initial material. If the reaction be carried out in the presence of larger amounts of catalyst, as for example from 15 to 20 per cent or more with reference to the initial material, the duration and temperature may be reduced. In many cases it is possible to decrease the duration to one third by increasing the amount of dehydrogenating catalyst from 10 per cent to 20 per cent.

When working under a pressure of hydrogen, the partial pressure of the same should advantageously be up to about 20 per cent or slightly more of the total pressure.

The reaction may also be carried out in the presence of cyclic compounds, as for example naphthalene, anthracene, phenanthrene, mineral coal tar fractions, tars or mineral oils containing cyclic hydrocarbons, or of liquid or gaseous olefines, as for example cracking gases, ethylene, propylene, butylene, or cracking products of oils or paraffin wax.

The following examples will further illustrate the nature of this invention but the invention is not restricted to these examples. The parts are by weight.

Example 1

400 parts of petroleum paraffin wax having a melting point of 55° C. are heated in an autoclave for 2 hours at 410° C. with 50 parts of a catalyst consisting of active carbon which has been impregnated with ammonium molybdate in such a manner that there are 16 per cent of molybdic acid on the carbon, the initial pressure being 40 atmospheres of nitrogen. The pressure rises to 140 atmospheres. The liquid reaction product obtained after cooling contains, in addition to a little benzine and middle oil and undecomposed paraffin wax a spindle oil very rich in hydrogen having a flat temperature viscosity curve, a specific gravity of 0.864 and a viscosity of 8.4° Engler at 20° C.

If, under otherwise identical conditions, 3 per cent of zinc chloride be also added to the initial material, a high quality lubricating oil having the viscosity of a machine oil is obtained.

Similar results are obtained if the initial materials are heated in a preheater under a pressure of 150 atmospheres and at a temperature of 410° C. together with the catalyst and with 0.25 cubic meter of nitrogen per kilogram of initial material and then passed continuously through the reaction space at such a velocity of flow that they remain therein for about 2 hours.

Example 2

350 parts of a paraffin wax from mineral oil having a melting point of 55° C. are heated in an autoclave to a temperature of 400° C. together with 50 parts of naphthalene and in the presence of 40 parts of the above-mentioned catalyst consisting of molybdic acid and carbon and of 10 parts of zinc chloride. The pressure which initially amounts to 40 atmospheres is produced by pressing on the materials under treatment a cracking gas containing 15 per cent of hydrogen, 18 per cent of olefines, the remainder consisting of aliphatic hydrocarbons. The liquid reaction product contains, besides benzine, middle oil and unchanged paraffin wax and naphthalene, a machine oil rich in hydrogen and having a flat temperature-viscosity curve.

What we claim is:—

1. The process of producing lubricating oils from waxy materials in a single operation which comprises heating a material, having a molecular weight of at least 250 and selected from the class consisting of hard and soft paraffin waxes, under elevated pressure and in the presence of a catalyst having a dehydrogenating action and a condensing action at a temperature above 200° C., the degree and duration of the heating being so adapted to the initial material and to the pressure that the reaction product contains a substantial amount of constituents which boil above 200° C. in vacuo and of which the hydrogen content is only slightly less than that of the initial material.

2. The process of producing lubricating oils from waxy materials in a single operation which comprises heating a material, having a molecular weight of at least 250 and selected from the class consisting of hard and soft paraffin waxes, under a pressure of at least 20 atmospheres and in the presence of a catalyst having a dehydrogenating action and a condensing action at a temperature above 200° C., the degree and duration of the heating being so adapted to the initial material and to the pressure that the reaction product contains a substantial amount of constituents which boil above 200° C. in vacuo and of which the hydrogen content is only slightly less than that of the initial material.

3. The process of producing lubricating oils from waxy materials in a single operation which comprises heating a material, having a molecular weight of at least 250 and selected from the class consisting of hard and soft paraffin waxes, under a pressure of at least 20 atmospheres and in the presence of a catalyst having a dehydrogenating action and of a catalyst of the Friedel-Crafts type at a temperature above 200° C., the degree and duration of the heating being so adapted to the initial material and to the pressure that the reaction product contains a substantial amount of constituents which boil above 200° C. in vacuo and of which the hydrogen content is only slightly less than that of the initial material.

4. The process of producing lubricating oils from waxy materials in a single operation which comprises heating a material, having a molecular weight of at least 250 and selected from the class consisting of hard and soft paraffin waxes, under a pressure of at least 20 atmospheres and in the presence of a catalyst having a dehydrogenating action and a condensing action at a temperature above 200° C., the degree and duration of the heating being so adapted to the initial material and to the pressure that the reaction product contains at least 20 per cent of constituents which boil above 200° C. in vacuo and of which the hydrogen content is only slightly less than that of the initial material.

5. The process of producing lubricating oils from waxy materials in a single operation which comprises heating a material, having a molecular weight of at least 250 and selected from the class consisting of hard and soft paraffin waxes, under a pressure of at least 20 atmospheres and in the presence of a catalyst having a dehydrogenating action and a condensing action at a temperature above 200° C., the degree and duration of the heating being so adapted to the initial material and to the pressure that the reaction product contains at least 20 per cent of constituents which boil above 200° C. in vacuo and of which the hydrogen content is about 10 per cent less than that of the initial material.

6. The process of producing lubricating oils from waxy materials in a single operation which comprises heating a material, having a molecular weight of at least 250 and selected from the class consisting of hard and soft paraffin waxes, under a pressure of at least 20 atmospheres at a temperature between about 200° and about 450° C. and in the presence of a catalyst having a dehydrogenating action and a condensing action, the degree and duration of the heating being so adapted to the initial material and to the pressure that the reaction product contains a substantial amount of constituents which boil above 200° C. in vacuo and of which the hydrogen content is only slightly less than that of the initial material.

7. The process of producing lubricating oils from waxy materials in a single operation which comprises heating a material, having a molecular weight of at least 250 and selected from the class consisting of hard and soft paraffin waxes, under a pressure of at least 20 atmospheres at a temperature above 200° C. and in the presence of a catalyst having a dehydrogenating action and a condensing action and essentially comprising an element from the fifth to eighth group of the periodic system, the degree and duration of the heating being so adapted to the initial material and to the pressure that the reaction product contains a substantial amount of constituents which boil above 200° C. in vacuo and of which the hydrogen content is only slightly less than that of the initial material.

8. The process of producing lubricating oils from waxy materials in a single operation which comprises heating a material, having a molecular weight of at least 250 and selected from the class consisting of hard and soft paraffin waxes, under a pressure of at least 20 atmospheres at a temperature above 200° C. and in the presence of a catalyst having a dehydrogenating action and essentially comprising an element from the fifth to eighth group of the periodic system and of a catalyst of the Friedel-Crafts type, the degree and duration of the heating being so adapted to the initial material and to the pressure that the reaction product contains a substantial amount of constituents which boil above 200° C. in vacuo and of which the hydrogen content is only slightly less than that of the initial material.

9. The process of producing lubricating oils from waxy materials in a single operation which comprises heating a material, having a molecular weight of at least 250 and selected from the class consisting of hard and soft paraffin waxes, under a pressure of at least 20 atmospheres at a temperature above 200° C. and in the presence of a catalyst having a dehydrogenating action and condensing action and of a cyclic hydrocarbon, the degree and duration of the heating being so adapted to the initial material and to the pressure that the reaction product contains a substantial amount of constituents which boil above 200° C. in vacuo and of which the hydrogen content is only slightly less than that of the initial material.

10. The process of producing lubricating oils from waxy materials in a single operation which comprises heating a material, having a molecular weight of at least 250 and selected from the class consisting of hard and soft paraffin waxes, under a pressure of at least 20 atmospheres at a temperature above 200° C. and in the presence of a catalyst having a dehydrogenating action and a condensing action and of an olefine, the degree and duration of the heating being so adapted to the initial material and to the pressure that the reaction product contains a substantial amount of constituents which boil above 200° C. in vacuo and of which the hydrogen content is only slightly less than that of the initial material.

11. The process of producing lubricating oils from waxy materials in a single operation which comprises heating paraffin wax under a pressure of at least 20 atmospheres at a temperature between about 200° and about 450° C. and in the presence of a catalyst having a dehydrogenating action and essentially comprising an element from the fifth to eighth group of the periodic system and of a catalyst of the Friedel-Crafts type with an addition of a cyclic hydrocarbon and of an olefine, the degree and duration of the heating being so adapted to the initial material and to the pressure that the reaction product contains at least 20 per cent of constituents which boil above 200° C. in vacuo and of which the hydrogen content is about 10 per cent less than that of the initial material.

12. The process for producing lubricating oils from waxy materials in a single stage which comprises simultaneously cracking and condensing a substance having a molecular weight of at least 250 and selected from the class consisting of hard and soft paraffin waxes by subjecting said substance to the action of a catalyst having a dehydrogenating and condensing action at a temperature in excess of 200° C. for a period of time ranging from ½ to 6 hours, the duration of treatment being shorter, within the range specified, the higher the temperature and pressure employed, and being so adjusted to the reaction conditions as to yield a product containing a substantial amount of constituents which boil above 200° C. in vacuo of which the hydrogen content is only slightly less than that of the initial material.

MATHIAS PIER.
ERNST DONATH.